United States Patent Office 2,872,475
Patented Feb. 3, 1959

2,872,475
PRODUCTION OF BENZONITRILE

Glenn Elden Gaumer, Lake Jackson, Tex., assignor to The Dow Chemical Company, Midland, Mich., a corporation of Delaware No Drawing. Application February 17, 1958
Serial No. 715,516

6 Claims. (Cl. 260—465)

The present invention relates to an improved process for the production of benzonitrile. More particularly the present invention concerns the improvement in the production of benzonitrile by the reaction of benzene with hydrogen cyanide which comprises the introduction of chlorine gas into the reaction zone. This novel feature results in the improved production of the desired benzonitrile product and a reduction in the undesired products of side reactions, such as dicyanobenzene, cyanobiphenyl and biphenyl.

It has now been found that the introduction of chlorine gas into the reaction zone simultaneously with the introduction of the hydrogen cyanide and benzene will increase the yield of the desired benzonitrile compound as much as 50 and at times 100 percent of that heretofore thought possible. Good results are obtained when employing 1 to 14 moles of hydrogen cyanide and from 0.03 to 1 or more moles of chlorine gas per mole of benzene. The reaction proceeds smoothly at temperatures of from 500 to 1100° C.

In carrying out the process of the present invention hydrogen cyanide and benzene are each vaporized and mixed with chlorine gas. This resulting hydrogen cyanide-benzene-chlorine mixture is fed into a reaction zone which is maintained at a temperature of between 500° and 1100° C. and preferably such introduction is at a rate such that the residence time of the reactants in the reaction zone is from about 0.2 to 20 seconds. However, longer or shorter contact times may be employed. The effluent from the reaction zone, containing the benzonitrile product, is then passed through cold traps and fractionally distilled to obtain the desired product in relatively pure form.

The temperature of the reaction zone is maintained between about 500 and 1100° C. and preferably between about 800 and 900° C. The temperature range set forth is that range in which the reaction occurs most favorably and with the minimal side reaction occurring at the preferred ratio of reactants. The reaction is preferably conducted under atmospheric pressure, however subatmospheric or super-atmospheric pressures may be employed.

The ratio of reactants is set forth as from 1 to 14 moles of hydrogen cyanide per mole of benzene. The preferred range for optimum yields is about 7 to 11 moles of hydrogen cyanide per mole of benzene and about 0.03 to 0.3 mole of chlorine per mole of benzene.

The following examples are illustrative of the present invention but are not to be construed as limiting.

Example 1

Hydrogen cyanide and benzene were vaporized and premixed in a molecular ratio of 8.7 to 1, respectively, and heated to 130° C. Chlorine gas was then mixed with the hydrogen cyanide and benzene in a ratio of 0.26 mole of chlorine gas per mole of benzene and the resulting mixture heated to 130° C. This mixture of hydrogen cyanide, benzene and chlorine was then fed to a vertical reaction tower which was maintained at about 875° C. The vaporized gases were fed through the reaction zone at such a rate that they would remain in contact in the reaction zone for approximately 3½ seconds. The effluent from the reaction zone was passed through several cold traps which were vented to a wet-test meter. The reaction product collected in the cold trap was fractionally distilled under reduced pressure to obtain benzonitrile in a yield of 80 mole percent.

Example 2

Hydrogen cyanide and benzene were vaporized and premixed in a molecular ratio of 3.8 to 1 respectively and heated to 115° C. Chlorine gas was then mixed with the hydrogen cyanide and benzene in a mole ratio of 0.06 mole of chlorine gas per mole of benzene and the resulting mixture heated to 115° C. This mixture of hydrogen cyanide, benzene and chlorine was then fed to a vertical reaction tower which was maintained at about 875° C. The vaporized gases were fed through the reaction zone at such a rate that the residence time in the reaction zone was approximately 7.2 seconds. The effluent from the reaction zone was passed through several cold traps which were vented to a wet-test meter. The reaction product collected in the cold trap was fractionally distilled under reduced pressure to obtain benzonitrile in a yield of 70.6 mole percent.

Example 3

Hydrogen cyanide and benzene were vaporized and premixed in a molecular ratio of 14 to 1, respectively, and heated to 125° C. Chlorine gas was then mixed with hydrogen cyanide and benzene in a mole ratio of 0.06 mole of chlorine gas per mole of benzene and the resulting mixture heated to 125° C. This mixture of hydrogen cyanide, benzene and chlorine was then fed to a vertical reaction tower which was maintained at about 875° C. The vaporized gases were fed through the reaction zone at such a rate that they would remain in contact in the reaction zone for approximately 2.3 seconds. The effluent from the reaction zone was passed through several cold traps which were vented to a wet-test meter. The reaction product collected in the cold trap was fractionally distilled under reduced pressure to obtain benzonitrile in a yield of 86.9 mole percent.

I claim:

1. In a process for the production of benzonitrile by the reaction of benzene and hydrogen cyanide at a temperature of from about 500° to 1100° C. the improvement which comprises mixing with said benzene and hydrogen cyanide from about 0.03 to 1 mole of chlorine per mole of benzene prior to introduction of the reactants into said high temperature reaction zone.

2. In a process for the production of benzonitrile by the reaction of a gaseous reaction mixture of hydrogen cyanide and benzene at a temperature of from 800° C. to 900° C. the improvement which comprises mixing with said gaseous reaction mixture, prior to introduction of the reactants into said high temperature reaction zone, from about 0.03 to 1 mole of chlorine per mole of benzene in said mixture.

3. In a process for the production of benzonitrile by the reaction of a gaseous reaction mixture containing from about 7 to 11 moles of hydrogen cyanide per mole of benzene in a reaction zone maintained between about 800° C. and 900° C.; the improvement which comprises admixing from about 0.03 to 1 mole of chlorine gas with said reactants prior to introduction of the reactants into said high temperature reaction zone.

4. A process for the production of benzonitrile as set forth in claim 1 wherein from about 7 to 11 moles of hydrogen cyanide per mole of benzene is employed.

5. A process for the production of benzonitrile as set forth in claim 1 wherein from between about 0.03 to 0.3 mole of chlorine per mole of benzene is employed.

6. A process for the production of benzonitrile as set forth in claim 1 wherein the time is about 2 to 7 seconds.

References Cited in the file of this patent

UNITED STATES PATENTS

| | | |
|---|---|---|
| 2,449,643 | Cosby | Sept. 21, 1948 |
| 2,716,646 | Willett et al. | Aug. 30, 1955 |